July 19, 1966     R. GUICHARD     3,261,544

SAFETY GUARD FOR FAN

Filed Oct. 10, 1963     2 Sheets-Sheet 1

INVENTOR.
ROLAND GUICHARD

BY

*AGENT*

July 19, 1966 R. GUICHARD 3,261,544
SAFETY GUARD FOR FAN

Filed Oct. 10, 1963 2 Sheets-Sheet 2

INVENTOR.
ROLAND GUICHARD
BY
*AGENT*

United States Patent Office 3,261,544
Patented July 19, 1966

3,261,544
SAFETY GUARD FOR FAN
Roland Guichard, Flers, France, assignor to North American Philips Company, Inc., New York, N.Y., a corporation of Delaware
Filed Oct. 10, 1963, Ser. No. 315,220
Claims priority, application France, Nov. 19, 1962, 915,836
4 Claims. (Cl. 230—275)

The invention relates to a safety guard for fans or the like. The invention has for its object inter alia to prevent or to render unharmful the random contact by human beings with the driven blade of a fan while at the same time providing a safety screen with large openings for fan blade efficiency.

According to the invention, the safety guard is caused to rotate by the flow of air produced by the blade wheel and in that at least one screening member comprises a number of radial blades, connected with a hub concentric to the blade wheel.

As a matter of course, the said rotation of the safety guard should require only a minimum amount of energy. Moreover, the dimensions and shape of the guard must be such that the aerodynamic efficiency of the assembly is not adversely affected, while the screen must be able of hindering the passage of an object from the outside.

The invention will now be described more fully with reference to the accompanying drawing, in which FIG. 1 is a longitudinal sectional view of a fan with a safety guard according to the invention, the driving motor being shown diagrammatically.

Figure 1:
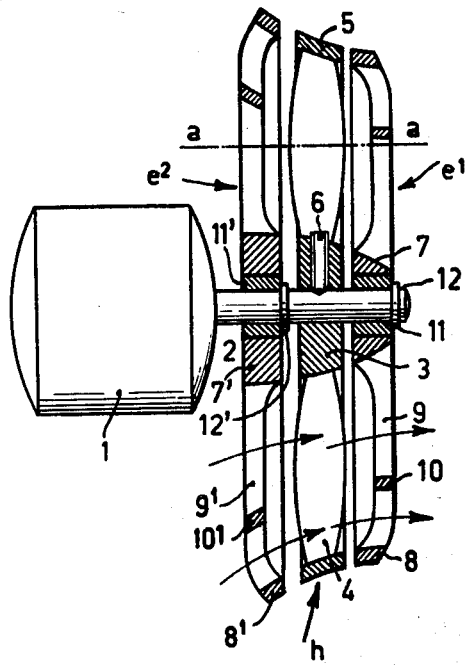

On the shaft 2 of a driving motor 1 of the device shown in FIG. 1 there is arranged an air screw $h$ formed by a number of radially arranged blades 4, which are integral with a hub 3.

Figure 3:
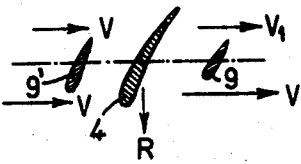
FIG. 3 is a sectional view taken on the line $a$—$a$ of the system shown in FIG. 1.

The said blades are peripherally guarded by an external ring 5 and the blades 4 are each fastened to the shaft 2 for example by means of a screw 6. The aerodynamic shape of the blades 4 is known; it may be used in different embodiments. The air movement is produced by the oblique position of the blades 4 as shown in FIG. 3.

In accordance with the invention of the blades 4 are shielded by two guards $e_1$ and $e_2$ of identical shape (the shape may be the same or it may be different in accordance with the protection desired).

In both cases the structure is such that each guard includes a hub 7, 7' and a peripheral ring 8, 8', interconnected by guard blades 9, 9', radially arranged.

At least one inner ring 10, 10' concentric to the shaft, connects the blades with each other and reinforces the structure of the assembly, so that a safety guard of large openings is formed.

The hubs 7, 7' are provided with bearings 11, 11' (sleeve bearings or ball bearings), so that the screen guards $e_2$, $e_2$ are freely rotatable about the shaft 2, whereas their axial displacement is limited by arresting ring 12, 12'.

Figure 2:
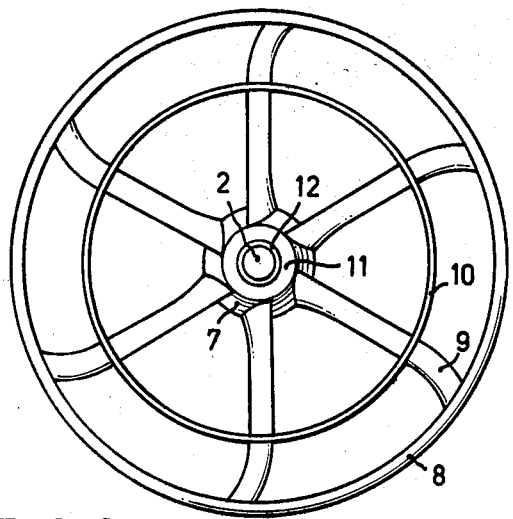
FIG. 2 is a front elevation of the safety guard of the system shown in FIG. 1.

The shape of the guard $e_1$ is shown in a front elevation in FIG. 2; identical parts are designated by the same reference numerals.

The guards $e_1$ and $e_2$ are made of a light-weight material, whch is flexible and deformable, for example of a synthetic substance or of a safety contoured metal of thin gauge.

As indicated in FIG. 3, direction of the air flow produced by the rotating blades 4 in the direction R is indicated by the arrows V. The guards $e_1$, $e_2$ are rotated with a fairly high speed, also in the direction R, when the guard blades 9, 9' occupy the oblique positions shown (FIG. 3) relatively to the longitudinal axis of the motor shaft and to the driven fan blades 4. As a matter of course the oblique positions of the blades 4, 9, and 9', and the direction of rotation of the blades 4, determine the direction of rotation of the guards and the speed of rotation thereof.

In the embodiment shown in FIGS. 1, 2 and 3:

The diameter of the blades 4 was 200 mms.
The number of blades 4 of the air screw: 3.
The width of blades 4 of the air screw: 18 mms.
The number of guard blades 9, 9': 6.
The width of guard blades: 5 mms.
The oblique position of the blades 4 of the air screw: 20°.
The oblique position of the guard blades 9, 9' with respect to the longitudinal axis of the motor shaft: 45°.
The speed of rotation of the air screw: 2000 rev./min.
The speed of rotation of the guards between 500 and 800 rev./min.

Figure 4:
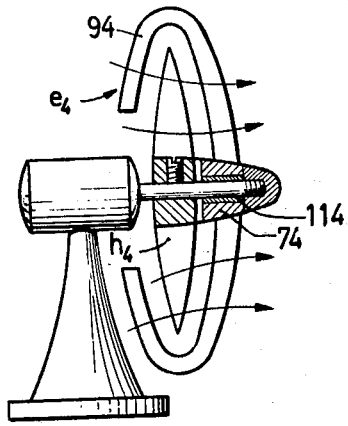
FIG. 4 shows a further embodiment of a safety guard according to the invention.

In accordance with the desired extent of protection numerous variants of the above described may be employed. The guards may be arranged without rings 5, 8, 8'. A single guard may be employed as shown in FIG. 4 in which a single guard $e_4$ is formed by radial collecting blades 94 arranged for free rotation on the drive shaft for the screw $h_4$ by means of a hub 74 with a bearing 114. The shape of these blades is such that the guard forms a cage surrounding the screw.

The guard blades 94 occupy an oblique position as is shown in FIG. 3, so that the guard can rotate freely under the action of the flow of air produced by the screw.

Figure 5:
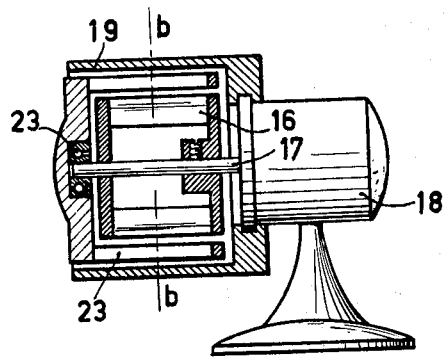
FIGS. 5 and 6 are a longitudinal sectional view and a cross sectional view (on line $b$—$b$ FIG. 5) a centrifugal blower having a safety guard embodying the invention.
Figure 6:
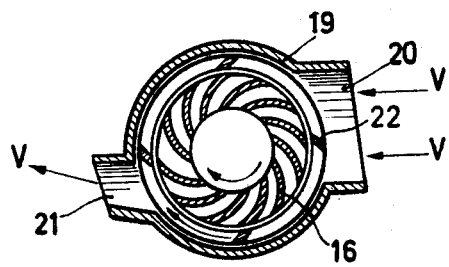

The concept of the invention may also be used with blowers of the centrifugal type and the tangential type as seen in FIGS 5 and 6.

In this embodiment the blower wheel 16 is fastened to the shaft 17 of the motor 18. The housing deflector 19 with the air openings 20 is adjustable. The guard 22, is also formed as a blower wheel consisting of a lightweight material, which is flexible and deformable, and which rotates freely about the shaft 17 by means of a bearing 23. This screen is moved under the action of the flow of air V produced by the blade wheel 16. In this embodiment the guard wheel 22 is arranged between the blower wheel 16 and the deflector 19, but it may also be arranged on the outer side thereof.

The descriptions given above are to be considered by way of example and any system in which a rotating member of a fan or blower produces a stream of air, so that a freely rotatable guard member is caused to move, lies within the scope of the invention.

What is claimed is:
1. Apparatus comprising a prime mover means having a driven shaft, air moving screw means attached to said shaft, and safety guard means for substantially completely enclosing said air moving means in spaced relation therewith, bearing means mounting at least a portion of said safety guard means on said shaft for free rotation, said safety guard means having radially extending aerodynamic blade members for rotating said safety guard means, said safety guard means consisting of lightweight material and being of open construction for maximum air flow therethrough.

2. Apparatus according to claim 1 wherein said safety guard means comprises, a ring member radially surrounding said air moving means and attached directly thereto, a pair of discrete guard members, one at each side of said air moving means, said discrete guard members being coextensive with said air moving means; each said discrete guard member comprising a pair of substantially concentric rings and a plurality of aerodynamically configured radially extending blade members connected with discrete hubs and interconnected with said concentric rings, the outer ring of said concentric rings being coextensive with said first mentioned ring member, and bearing means including said hub for rotatably connecting each one of said discrete guard members on said shaft, and means for preventing axial movement of said hubs relative to said shaft.

3. Apparatus according to claim 1 wherein said safety guard means comprises a plurality of generally U-shaped aerodynamically configured blade members, a hub member rotatably connected with said shaft and positioned at one side of said air moving means, one end of each said blade member being connected with said hub member for supporting said blade members in spaced substantially parallel relation, said U-shaped blade members substantially surrounding said air moving means, the other end of each said blade member remote from said one end terminating freely at the side of said air moving means opposite said hub.

4. Apparatus according to claim 1 wherein said aerodynamic blade members consist of an elastic material.

References Cited by the Examiner

UNITED STATES PATENTS

| | | | |
|---|---|---|---|
| 557,300 | 3/1896 | Barber | 103—98 |
| 759,951 | 5/1904 | Winch | 230—275 |
| 910,760 | 1/1909 | Wood | 230—274 |
| 1,467,537 | 9/1923 | Dornier | 170—165 |
| 1,725,085 | 8/1929 | Johnson | 230—274 |
| 2,262,854 | 11/1941 | Morris | 230—274 |
| 2,791,373 | 5/1957 | Wilcox | 230—275 |
| 2,824,429 | 2/1958 | Zucker | 230—274 |

FOREIGN PATENTS

| | | |
|---|---|---|
| 977,357 | 11/1950 | France. |
| 499,985 | 12/1919 | France. |
| 139,785 | 10/1920 | Great Britain. |

LAURENCE V. EFNER, *Primary Examiner.*